(12) United States Patent
Gombert et al.

(10) Patent No.: US 7,591,892 B2
(45) Date of Patent: Sep. 22, 2009

(54) AQUEOUS ADHESIVE COMPOSITION BASED ON LEGUME STARCH

(75) Inventors: Hervé Gombert, Hinges (FR); Marika Ladret, Lompret (FR); Pascal Corriette, Merville (FR); Régis Houze, Tourmignies (FR); Christian Bouxin, Marquillies (FR)

(73) Assignee: Roquette Freres, Lestrem (FR)

( * ) Notice: Subject to any disclaimer, the term of this patent is extended or adjusted under 35 U.S.C. 154(b) by 703 days.

(21) Appl. No.: 10/534,037

(22) PCT Filed: Oct. 24, 2003

(86) PCT No.: PCT/FR03/03158

§ 371 (c)(1),
(2), (4) Date: May 6, 2005

(87) PCT Pub. No.: WO2004/044082

PCT Pub. Date: May 27, 2004

(65) Prior Publication Data

US 2006/0113028 A1 Jun. 1, 2006

(30) Foreign Application Priority Data

Nov. 6, 2002 (FR) .................................. 02 13910

(51) Int. Cl.
*C09J 103/04* (2006.01)

(52) U.S. Cl. ................. 106/206.1; 106/211.1; 156/206; 428/182

(58) Field of Classification Search ............... 106/206.1, 106/211.1; 156/205; 428/182
See application file for complete search history.

(56) References Cited

U.S. PATENT DOCUMENTS

| 3,444,109 A | 5/1969 | Golick et al. |
| 4,587,332 A | 5/1986 | Lane et al. |
| 5,454,863 A | 10/1995 | Foran et al. |
| 5,641,349 A | 6/1997 | Koubek et al. |
| 6,964,703 B2 * | 11/2005 | Geeroms ................. 106/211.1 |

OTHER PUBLICATIONS

Ratnayake et al, Starch 54 (2002), pp. 217-234.*

* cited by examiner

*Primary Examiner*—David M Brunsman
(74) *Attorney, Agent, or Firm*—Young & Thompson

(57) ABSTRACT

An adhesive composition includes an aqueous dispersion having a primary part, consisting essentially of a gelatinized starch, and a secondary part, comprising essentially a non-gelatinized starch and/or a swollen starch, wherein the starch of the secondary part is a native legume starch, and the starch of the primary part is optionally a native or modified legume starch, the legume starches having an amylose content ranging between 30 and 52%. The invention also concerns the method for preparing such a composition, comprising its use, assembling the parts and drying and satisfying the requirements of modern fast machinery.

38 Claims, No Drawings

AQUEOUS ADHESIVE COMPOSITION BASED ON LEGUME STARCH

This application is a 371 of PCT/FR03/03158, filed 24 Oct. 2003.

The present invention relates to novel aqueous adhesive compositions prepared essentially from legume starches.

The invention relates more particularly to novel aqueous adhesive compositions based on legume starch designed in particular for the manufacture of corrugated fibreboards.

It is also directed to a process for the preparation of corrugated fibreboard involving such compositions composed essentially of legume starch, in the primary and/or secondary part.

It also relates to the corrugated fibreboard thus obtained.

The term "starch", within the meaning of the present invention, is understood to mean any kind of starch, in particular of any origin, including cereal starches, such as wheat starch, and tuber starches. The starches according to the invention can have various degrees of purity, in particular starches exhibiting a high starch content, in particular of greater than 90% (dry/dry), as well as a very low content, for example of less than 1% (dry/dry), of colloidal matter and of fibrous residues.

The starch content is preferably greater than 95%, more preferably greater than 98% (dry/dry).

At the same time, the protein content is low, i.e. less than 1%, preferably less than 0.5%, more preferably between 0.1 and 0.35% (dry/dry).

The starches used according to the invention can either be in the native state or in a modified state.

The term "legume", within the meaning of the present invention, is understood to mean more particularly the family of the Papilionaceae, the most important representatives of which are: bean, pea, lentil, broad bean, alfalfa, clover and lupin.

The term "legume starch", within the meaning of the present invention, is understood to mean the starches extracted from legumes, and in particular from peas, exhibiting in particular a high starch content, in particular of greater than 90% (dry/dry), as well as a very low content, for example of less than 1% (dry/dry), of colloidal matter and of fibrous residues.

The starch content is preferably greater than 95%, more preferably greater than 98% (dry/dry).

At the same time, the protein content is low, i.e. less than 1%, preferably less than 0.5%, more preferably between 0.1 and 0.35% (dry/dry).

The term "aqueous adhesive compositions", within the meaning of the present invention, is understood to mean any aqueous adhesive composition, intended in particular for the preparation of corrugated fibreboard, comprising a part of solubilized starch, referred to as carrier or primary part, exhibiting satisfactory suspending properties, in particular with respect to granular starch, and a part of non solubilized and/or only hydrated starch, i.e. which is in the form of insoluble granules and/or of at least partially swollen granules, also referred to as secondary part.

For example, such compositions involving, as secondary part, a starch in the form of insoluble granules are generally prepared according to the principles known to a person skilled in the art under the name of "Stein-Hall process".

In accordance with the principles of said process, at least one starch, water and an alkaline agent are brought together, heated together, for example, moderately in an open vat and with live steam or, more vigorously, using a continuous cooker, so as to obtain an alkaline colloidal solution exhibiting in particular suitable characteristics of rheology and having a suitable ability to keep insoluble and/or only hydrated particles in suspension.

This procedure constitutes a method of preparation of the "primary" or "carrier" part.

According to other principles of the "Stein-Hall" process, a dispersion combining at least water and granular starch is prepared at the feed temperature of the water. A boron derivative, commonly borax, is generally combined with them. The slurry obtained constitutes the "secondary" part.

The primary and secondary parts are carefully mixed using various methods, for example continuous or batchwise procedures.

According to a related procedure, it is possible to successively add water and granular starch and, most frequently, borax to the primary part.

This "Stein-Hall" process is the oldest. Still very widespread, it makes possible the preparation of aqueous adhesive compositions for which the final solids content, an essential parameter, varies, in standard practice, between 20 and more than 30%.

Another process, comprising a primary part with solubilized starch and a secondary part with a starch in the form of insoluble granules, is known under the name of "Pristim®" process (European Patent EP 0 229 741, in the name of the Applicant Company). In the context of this process, the primary part, or carrier, is prepared by a substantial increase in the temperature and without an alkaline agent.

According to yet another process, known under the name of "Minocar" process, the primary part is combined with a dispersion of partially swollen starch (European Patent EP 0 038 627).

Irrespective of the process for preparing the primary and secondary parts, technological development in materials has led a person skilled in the art to turn his attention to aqueous adhesive compositions with high solids contents.

Such an approach offers the advantage of reducing the amount of water to be evaporated and of achieving a more favourable heat balance.

The "Stein-Hall" process has in particular been described in this way in many patents. Mention may be made of:

French Patent FR 2 386 593, which claims adhesive compositions exhibiting a solids content of between 10 and 40% by weight, European Patent EP 0 376 301, which claims specific compositions with solids contents which can range up to 60%, U.S. Pat. No. 4,787,937, which claims an adhesive composition where an amylose-rich starch is used in the carrier, and a manioc starch in the secondary part.

It is observed that numerous approaches based on the increase in the solids content of the adhesive composition rely on the major use of maize starch, possibly on wheat starch.

In the context of these various solutions, the amylose content of the starch of the primary part can vary greatly, either among conventional values, with 20 to 28% of amylose, or much higher values, possibly reaching 70% and more.

On the other hand, only European Patents EP 0 627 477 and EP 0 849 342 provide for the use of a starch exhibiting a high amylose content for the secondary part.

For the first, the modified starch comprises at least 40%, preferably 50%, of amylose. In the second, the starch comprises more than 60% of amylose.

Another attractive solution consists in using potato starch in the secondary part, whether modified or unmodified.

While such formulations exhibit the advantage of the "double kiss" feature (property of ungluing/regluing), it is absolutely essential to provide, for the primary part or carrier, an amylaceous material other than those resulting from potato starch.

This is because solubilized potato starch does not possess, at the solids contents under consideration, whether unmodified or chemically or physically modified, a sufficient capacity to keep in suspension granules of amylaceous material of the secondary part, irrespective of the nature thereof, in particular if the latter is itself of native potato starch.

The direct consequence of this aspect is the need, for these compositions, to provide at least two different amylaceous materials, which, in the context of current, in particular continuous, plants for receiving and preparing, constitutes a significant disadvantage in their use.

At another level, it is observed that supplying potato starch is becoming difficult, essentially because of the costs of extraction and because of the regulations to which it is subjected.

By comparison, among the various sources of amylaceous materials, those composed of legume starches, in particular pea starches, can be regarded as readily available under good conditions, in particular economic conditions.

U.S. Pat. No. 4,942,191 has already concerned itself with the use of pea flours in the formulation of industrial adhesives comprising formaldehyde resins, intended in particular for the manufacture of plywoods.

U.S. Pat. No. 4,587,332 essentially claims a wheat starch, referred to as "B", also known to a person skilled in the art under the name of "second starch", with a reduced viscosity, obtained in particular by hydrolysis, but also discloses a modified pea starch, subject to the same viscosity constraints. The recommended pea starch exhibits a certain content in colloidal substances and in proteins.

This patent subsequently claims the use of the modified second wheat starch (fraction B), which is preferred, or of the modified pea starch in the primary part of an adhesive composition for corrugated fibreboard, and the corrugated fibreboard obtained.

On relatively similar bases, European Patent EP 0 627 478 envisages, in its description, the use, among other starches, of pea starches in the primary part, or carrier, but only starches exhibiting a very high amylose content, of greater than 60%, preferably of greater than 70%, are considered.

In a similar spirit, European Patent EP 0 849 342 claims the use, this time in the secondary part, of a starch with an amylose content of greater than 60%, in such a fashion that the amylose content, calculated with respect to the total starch, is at least 15%. It also mentions, in such a context, the source of such starches, which can be pea.

Patent EP 0 627 477 claims the use, in the secondary part, of a starch with an amylose content which remains high, i.e. greater than 40%, preferably 50%, for which starch a chemical modification is necessarily required, in particular by oxidation, hydrolysis, esterification or other means, to allow suitable tack, and a machine speed capable of being increased. In particular, it is specified therein, by the citation of the teachings of U.S. Pat. No. 3,532,648, that the use, even a partial use, in the secondary part, of an unconverted starch with an amylose content of greater than 35%, makes it possible to improve the resistance to water, but is accompanied by a reduction in the speed of the machine incompatible with current requirements.

On the various bases set out above, it could be observed that the increase in the solids content has shown its limits during assembling operations on modern equipment. While these revealed limits can vary according to the materials used, they are no less real thereby and constitute so many disadvantages, whether with respect to the preparation of the carrier part or with respect to the preparation of the adhesive composition in its entirety, its rheological characteristics, its machine behaviour, which is of increased importance as said machine becomes faster, or with respect to the performances which it allows.

This is because it should be considered that the quality of the adhesive bondings depends on both the machine speeds and on the characteristics and properties of the adhesive composition.

As the criteria relating to the viscosity or to the rheology are becoming rigorous, the characteristics of the compositions relating thereto have to change in a strict fashion for satisfactory circulation of the adhesive composition in the various pieces of equipment, and in operational or storage components.

In particular, the change in the rheological characteristics has to be sufficiently slight for the adhesive composition to retain a suitable viscosity necessary for the satisfactory positioning thereof on the tip of the flute and for appropriate attachment to the paper, in particular via suitable penetration.

In addition, for a person skilled in the art, the requirements of instantaneous adhesion or tack are particularly urgent because of the increase in the speeds and of the reduction in the times during which the temperature and pressure are maintained.

A person skilled in the art is all the more sensitive to these aspects as he also wishes to reduce the energy costs.

These considerations become more acute when the manufacturing operation concerned proves to be difficult. This is because it may be considered, very generally, that the manufacture of "single face" (SF) or "single wall" (SW) fibreboard does not harbour any major difficulty and that, on the other hand, the manufacture of "double wall" (DW) or "triple wall" (TW) fibreboard, of microflutes and/or of heavy fibreboard has many difficulties.

From this examination, it may be concluded that a person skilled in the art does not currently have access to adhesive compositions capable of satisfying all the requirements for operating on modern assembling machines, in particular high speed machines, wherein said adhesive compositions are simultaneously:
- simple, with regard to the importance of reducing the number of materials, indeed even using a single amylaceous material, in particular in the context of automatic and/or continuous preparation plants,
- inexpensive or, at the least, of reduced cost, in comparison with those inherent, for example, in the use of potato starch,
- free in terms of supply and regulations,
- high performance, by comparison to maize starch, even rich in amylose, in particular with the rise in solids content.

In addition, manufacturers of corrugated fibreboard are commonly confronted with orders relating to corrugated fibreboard exhibiting resistance to water. For these specific requirements, they have available suitable formulations comprising specific amylaceous materials and resins supplied for this sole purpose, thereby multiplying the number of amylaceous products.

This aspect assumes an inconsistent nature in so far as the multiple supply is to be compared with a production of water-resistant corrugated fibreboard which is often minor, in terms of amounts and of proportions, compared with conventional products, which are greatly predominant.

A major and priority technical problem is to be added thereto, consisting in incorporating the requirements of public health and salubrity in the overall performance of water-resistant fibreboard. The problem is acute in that this property is currently guaranteed by the use of formaldehyde resins. Fortunately, it is achieved by formaldehyde resins exhibiting increasingly low amounts of free formaldehyde, making it possible to substantially limit the emanations.

It is observed that, from this viewpoint, resins with low contents in free formaldehyde are relatively numerous on the market. The choice can be guided in particular by the nature of the starting material, without it being possible to hope to eliminate the disadvantages thereof.

While the constant concern introduced has made it possible to very substantially reduce the level of emanations, the scale and the gravity of the attacks on the health are such that everyone wishes for them to disappear purely and simply.

From this viewpoint and in a fairly general way, a person skilled in the art has not yet learnt to manage without these resins in so far as the proposed solutions are not very numerous.

In this spirit, European Patents EP 0 627 477, EP 0 627 478 and EP 0 849 342, which have already been mentioned, provide for the preparation of adhesive compositions lacking formaldehyde derivatives.

However, although having the merit of proposals concerned with the health of the operators and of the consumers, they only succeed at the cost of major disadvantages:

That of the cost: this is because European Patent EP 0 627 477 provides for the use of an amylose-rich starch (content at least equal to 40%) for which the chemical modification, a necessary change, is expensive. The examples involve, in addition, essentially a maize starch with an amylose content of approximately 50%, a starting material which increases the cost, and this, in the context of the secondary starch, which is a fraction comprising the great majority of all the starch.

Patents EP 0 627 478 and EP 0 849 342 disclose the use of starches with an amylose content of greater than 60% resulting from specific plants including a genotype favourable to the production of amylose. These plants, maize, peas, barley or rice, require specific cultivation which is difficult, complex and expensive.

That of the supply: the European patents concerned do not expressly disclose the uniqueness of the starting material. This is because the various main claims relate to one or other of the components, of the primary part or of the secondary part, participating in the heterogeneity of the materials or encouraging it.

That of the performance: the criterion set out in deciding on the conformity of the adhesive composition with respect to the resistance to water is composed of the "wet pin adhesion" test, a test which does not necessarily correspond to the criteria and strictness used in other regions of the world, in particular Europe, where a European standard exists, is applied and expressed in the form of the "FEFCO No. 9" test.

In the light of these aspects, the Applicant Company considers that the said patents only provide partial and imperfect solutions to the problem posed.

Overall, there exists a need, first, to provide aqueous adhesive compositions which can satisfy all the requirements presented by modern equipment, in particular in terms of rheology and of performance, which are simple to employ, which are reasonable in cost and, at the same time, which are easy to access in terms of supply and of regulations.

There exists a second need to develop adhesive compositions capable of producing water-resistant adhesive joints which involve the same starting material, aiming at the complete uniqueness of the supply, and, at the same time, concerned with the environment and aiming at public health.

In point of fact, it is to the credit of the Applicant Company to have established that such compositions, meeting all these requirements, can be prepared from legume starches, in particular pea starches, within the meaning of the present invention.

In other words, the present invention relates to novel aqueous adhesive compositions perfectly suited to machines providing for rapid development of the adhesive bonding.

It also aims at the improvement in the characteristics of "tack", of development of the adhesive bonding on said machines described as fast, of quality of the assembling, in particular in terms of strength of the adhesive joint, and of other characteristics related, for example, to the behaviour of the corrugated fibreboard produced on cutting at the end of the assembling machine, to the ease of shaping or to the durability of the adhesive bondings and of the shapes.

It also relates to specific adhesive compositions suitable for the preparation of water-resistant assemblages.

More specifically, an adhesive composition according to the invention which meets the first series of requirements, relating to the requirements of modern equipment, in particular in terms of rheology and of performance, is characterized in that it comprises an aqueous dispersion having a primary part, composed essentially of a solubilized starch, and a secondary part, essentially comprising a starch in the form of insoluble granules and/or of at least partially swollen granules, in which the starch of the primary part comprises a starch selected from the group consisting of native and modified legume starches, native and modified cereal starches and native and modified tuber starches, alone or as a mixture with one another.

Advantageously, according to the invention, when the starch of the primary part comprises a legume starch, the starch of the secondary part is then selected from the group consisting of native legume starches, native and modified cereal starches and native and modified tuber starches preferably having an amylose content of less than 35% (preferably 30%, more preferably 27%, more preferably still 25%), alone or as a mixture with one another.

Also advantageously, according to the invention, when the starch of the primary part is a native or modified cereal or tuber starch, the starch of the secondary part comprises at least one native legume starch.

Advantageously, according to the invention, the said legume starches furthermore exhibit a purity of greater than 90%, preferably of greater than 95% and more preferably still of greater than 98%, as well as colloidal matter and/or fibrous residue contents of less than 1% (dry/dry) and protein contents of less than 1% (dry/dry), and an amylose content of between 30 and 52% (dry/dry).

This content is in particular greater than 30.5%, preferably greater than 31%, and in particular less than 45%, preferably less than 40%. It is advantageously between 31.5 and 39.5%.

The invention also relates to an adhesive composition, characterized in that it comprises an aqueous dispersion having a primary part, composed essentially of a gelatinized starch, and a secondary part, essentially comprising a nongelatinized starch and/or a swollen starch, in which the starch of the secondary part is a native legume starch and the starch of the primary part is optionally a native or modified legume starch.

Advantageously, according to the invention, the said starches exhibit a high purity, of greater than 90%, preferably of greater than 95%, more advantageously still of greater than 98%, as well as low contents, for example and respectively of less than 1% (dry/dry) of colloidal matter and of fibrous residues and of less than 1% of proteins, and an amylose content of between 30 and 52%.

This content is in particular greater than 30.5%, preferably greater than 31%, and in particular less than 45%, preferably less than 40%. It is advantageously between 31.5 and 39.5%.

Preferably, said composition comprises between 10 and 40% by weight of legume starch and between 0.3 and 5% by weight of an alkaline substance, these percentages being expressed with respect to the whole of said composition. In addition, it advantageously comprises between 0.01 and 5% by weight, with respect to the total starch, of borax or of any other boron-carrying chemical compound.

In addition, an adhesive composition according to the invention and corresponding to a combination of constraints, both in terms of high requirements related to modern equipment and in terms of resistance to water, is characterized in that it comprises an effective amount of a resin selected from the group consisting of formaldehyde resins and of formaldehyde-free synthetic resins.

According to another embodiment, an adhesive composition according to the invention, which satisfies the criteria of resistance to water but also of public health and hygiene, is characterized in that it is preferably devoid of formaldehyde resin or even of synthetic resin and comprises an effective amount of a chemical agent selected from sulphates, in particular zinc sulphate, aluminium sulphate or copper sulphate, zirconium-carrying compounds or diammonium phosphate.

The term "effective amount" is understood to mean, in this context, an amount of resin or of chemical agent at least equal to that which allows said adhesive composition to confer, on the final corrugated fibre-board, good properties of resistance to water according to the FEFCO no. 9 test.

It is also to the credit of the Applicant Company to provide a process for the preparation of corrugated fibreboard suited to said compositions, characterized in that it comprises, at least once, the steps consisting in distributing the adhesive composition according to the invention on the tips of the flutes of a strip of preshaped paper, in applying a flat fibreboard or paper to the flute tips thus coated, and in drying.

It is thus easy, by the use of compositions according to the invention and by appropriate means, to prepare corrugated fibreboard which satisfies the requirements of the art, including for the preparation of fibreboard often defined and known to a person skilled in the art under the names of "single wall" fibreboard, "triple wall" fibreboard or "heavy" fibreboard, i.e. with a high basis weight (weight per square meter), or exhibiting a number of flutes of greater than 3, and/or microflutes.

In other words, the legume starch, more particularly pea starch, within the meaning of the invention constitutes, as is desired, a means which is simple, in particular by the uniqueness allowed of the amylaceous material, inexpensive, easily supplied, free from strict regulations and of high performance, provided that, in the context of suitable formulations, said legume starch, and more particularly pea starch, represents a significant proportion of the amylaceous material present in the adhesive composition.

It is also to the credit of the Applicant Company to have observed that, surprisingly and unexpectedly, the objectives of resistance to water of the adhesive joints obtained by the use of resins with low contents in free formaldehyde or by the complete absence of formaldehyde resin and even of any crosslinking or intrinsically hydrophobic resin can be satisfactorily achieved by the use of adhesive compositions devised on the essential basis of legume starches, more particularly of pea starches.

More particularly, depending on whether they comprise a formaldehyde or formaldehyde-free resin, a nonsynthetic and formaldehyde-free water-resistance agent which is carefully chosen, they are capable of meeting the specific requirements of resistance and of not harming the environment, and they do not affect the health and hygiene conditions.

In addition, it has been observed that all the legume starches which can be used according to the invention may be suitable for such formulations.

More specifically, it has been found that a pea starch with an amylose content of less than 52%, preferably of less than 45%, used in the primary part contributes to substantially improving the rheological properties of the adhesive composition.

Similarly, the use of a pea starch with an amylose content of less than 52%, preferably of less than 45%, in the secondary part, in all or part, substantially improves the tack, the speed of development of the adhesive bonding and the quality of said adhesive bonding.

It is thus observed that providing a legume starch, more particularly a pea starch, both in the primary part and secondary part of the adhesive composition according to the invention, acts very positively on all the criteria set out above, i.e. of improving all the operating parameters and all the characteristics useful to corrugated fibreboard.

The Applicant Company furthermore considers that it is entirely possible, to the greater satisfaction of the user, for the preparation of adhesive compositions according to the invention, to use unmodified, in particular chemically unmodified, pea starches.

However, it is very clear that modified, in particular etherified, esterified or crosslinked, legume starches can be used in the primary part while knowing that their use is not justified in the secondary part.

This is because these materials, which are normally higher in cost, are, contrary to the teachings of U.S. Pat. No. 5,454,863, are not especially required in the secondary part with regard to the absence of technical advantage in comparison with native legume starches. On the other hand, their presence is justified in the primary part by an additional improvement in the rheological properties and by the stability of the adhesives but an improvement in terms of tack, of development of the adhesive bonding, of quality of the finished adhesive bonding and of its resistance, in comparison with the characteristics developed by unmodified starches.

It is also entirely possible to use pea starches which are partially oxidized or hydrolysed by the action of at least one acid or of an enzyme, in particular for the preparation of the primary part, so as to adjust the viscosity thereof or to increase the concentration thereof in the preparation. Another advantageous solution which aims at the same objective of adjusting the viscosity of the primary part or of increasing its concentration in the preparation and which furthermore makes it possible to retain the same material for the primary and secondary parts consists in preparing the carrier by using a "direct steam" cooking device for the dissolution of the starch of the primary part, in particular continuously.

Such measures, aiming at reducing the viscosity, have the merit of making possible an increase in the solids content which, in the context of using pea starch, results in a faster ability to develop adhesive bonding, without this harming the rheological characteristics of the adhesive compositions concerned.

Other modification operations are possible, such as physical modification operations, like, for example, the thermal operations known to a person skilled in the art under the name of annealing or of hot moisture treatment (HMT), or thermomechanical modification operations, such as pregelatinization on rotary dryers or extrusion.

In a particularly advantageous way, it is possible to envisage combining the native or modified legume starch with at least one plasticizer selected from hydroxy-carboxylic acids, their salts and derivatives, in particular from lactates and gluconates, glycerol, ethylene glycol, propylene glycol, polyethylene glycols (PEG), polypropylene glycols (PPG), and in particular the members of these two families having a molecular weight of less than 3000, urea and/or nitrates.

The levels of plasticizer introduced are preferably between 0.1 and 20%, calculated with respect to the starch, preferably between 1 and 15%, more preferably between 2 and 10%.

A certain number of polyhydroxylated polymers, generally exhibiting high viscosities, known for such uses, such as cellulose derivatives, poly(vinyl alcohol)s, poly(vinyl acetate)s or polyvinyl-pyrrolidone, can be added, in particular to the primary part.

The various aspects of the present invention relating to the formulation and to the preparation of conventional adhesive compositions will be described in more detail using the following examples, which are in no way limiting.

At another level, but as a result of the particularly encouraging observations made from the preparation of such adhesive compositions which are entirely formulated with various grades of pea starches, exhibiting variable amylose levels, in particular of between 30 and 52%, the work carried out has resulted, always with the major concern for the uniqueness of the starting material and of the supplying, in the study and the development of formulations specifically intended for resistance to water.

More specifically, it has been observed that all the legume starches, and in particular the pea starches, within the meaning of the present invention may be suitable for this role, in particular those with an amylose level of between 30 and 52%, preferably of between 30.5 and 45%, more preferably between 31 and 40%. This level is advantageously between 31.5 and 39.5%.

The Applicant Company concludes therefrom that these observations are surprising and unexpected and go against the approaches pursued to date with starches having particularly high contents in amylose, in particular amylose-rich maize starches, in particular those for which the content is of the order of 70%, indeed even more.

Apart from the amylose content, the overall solids content of the adhesive composition is a major parameter for the level of performance in terms of resistance to water.

It has been observed that this notion is all the more important in the case of an adhesive composition according to the invention, prepared from legume starches, in particular pea starch, and that, more particularly in this case, it strongly conditions the degree of resistance to water.

More specifically, without formaldehyde resin or crosslinking or intrinsically hydrophobic synthetic resin, without the involvement either of any other agent which improves the resistance to water, the Applicant Company considers that, to meet the requirements in terms of resistance to water, in particular the European requirements reflected by the FEFCO No. 9 test, it is necessary to use, in the case of the preparation from legume starch, more particularly pea starch, an adhesive composition having a solids content of greater than approximately 26%, preferably of at least approximately 28%.

On the other hand, and in comparison, it has also been observed that there exist readily accessible and easy to employ means for disregarding these recommendations, which means consist in using, in a complementary fashion and in small amounts, at the expense of minimum modifications in the formulations, agents which improve the resistance to water. These agents are selected in particular from salts, such as sulphates, in particular zinc sulphate, copper sulphate or aluminium sulphate, diammonium phosphate or a zirconium-carrying compound.

Aluminium sulphate in particular is a readily available product. Often recommended in patents, widely used both in the manufacture of paper and the manufacture of fibreboard, its involvement is generally justified by the need for the presence of $Al^{+++}$ ions in the wet part of the paper machine for known functions, such as pH correction, making it possible in particular to halt an enzymatic reaction (Japanese Patent JP 49.143) or the swelling of the starch (U.S. Pat. No. 3,487,033, for example), for the control of a viscosity (U.S. Pat. No. 3,622,388, for example), sometimes for a very specific function, such as, for example, a cleaning action (U.S. Pat. No. 4,018,959). At the same time, its use has nevertheless never been suggested for the specific purposes of improving the resistance to water.

More specifically still, additions of one, carefully chosen, of these salts, in entirely reasonable amounts make possible access for very good effects of resistance to water observing the European standard, to compositions with a solids content only of greater than approximately 20%, preferably equal to or greater than 22%.

According to a preferred embodiment of the invention, the agent which improves the resistance to water is zinc sulphate.

In yet another way, it remains possible to use, in the context of the deployment of an adhesive composition according to the invention, the resins commonly added to obtain suitable resistance to water, such as formaldehyde resins, for example urea-formaldehyde, ketone-formaldehyde, resorcinol-formaldehyde or phenol-formaldehyde resins, or formaldehyde-free resins, generally exhibiting an intrinsic hydrophobic nature and/or bridging ability.

In such a context, it is considered that it is possible to substantially reduce, and in the majority of cases, the working amount of said resin, whatever the nature thereof, and/or to reduce the solids content of the adhesive. It is thus possible to reasonably envisage solid contents of approximately 24%, preferably of greater than this value, in particular equal to or greater than 26%.

The various aspects of the present invention relating to the available means for meeting the requirements of resistance to water, in particular the European requirements, will be described in more detail using the examples, which are-in no way limiting.

EXAMPLE 1

An adhesive composition according to the invention, of "Stein-Hall" type, is prepared from a pea starch having a starch content of greater than 95%, a content of proteins of 0.38% and a content of colloidal substances of less than 1%.

The amylose content of said starch is 36.7%.

It is prepared in a similar way to that currently employed for the sole use of wheat starch, in the primary and secondary parts.

The comparative formulations with the essential parameters given below are produced:

|  | Pea starch | Wheat starch |
|---|---|---|
| Primary part: | | |
| Water | 450 ml | 450 ml |
| Starch | 41 g | 45 g |
| Heating | 45° C. | 45° C. |
| Pure sodium hydroxide and water | 4.5 g/10 ml | 4.5 g/10 ml |
| Stirring | 10 minutes | 10 minutes |
| Secondary part: | | |
| Water | 675 ml | 675 ml |
| Starch | 332.5 g | 330 g |
| Borax | 4 g | 4 g |
| Stirring | 10 minutes | 10 minutes |
| Characteristics | | |
| Lory viscosity | 25 seconds | 26 seconds |
| Brookfield viscosity | 370 mPa·s | 360 mPa·s |
| Stein-Hall viscosity | 104 seconds | 109 seconds |
| Refractive index | 4.2 | 4.3 |
| Lory viscosity: | | |
| after 2 min. | 27.5 seconds | 30 seconds |
| after 5 min. | 30.5 seconds | 34.5 seconds |
| after 10 min. | 35 seconds | 43 seconds |

Adhesive bonding of single wall type is carried out:

| Gelatinization point - secondary part after assembling | 53° C. | 53.5° C. |
|---|---|---|
| Tack - 95° C. on a Strohlein device | | |
| open time (O.T.) 0 | 6.2 seconds | 6.8 seconds |
| open time (O.T.) 5 | 4.4 seconds | 4.2 seconds |
| Dry pin adhesion | | |
| 6.5 s. of heating at 95° C. | 41.1 daN | 41.1 daN |

It is thus observed that the behaviour, both rheological and in terms of gelatinization point and of quality of the adhesive bondings produced, of adhesive compositions obtained from pea starch in accordance with the invention, is very similar to that exhibited by compositions prepared with wheat starch.

In addition, the embodiments are very similar.

EXAMPLE 2

A comparison is carried out based on conventional compositions of "Stein-Hall" type.

More specifically, a first composition comprises a maize starch in its primary part and a potato starch in its secondary part.

By way of comparison, a formulation is drawn up which makes possible access to a composition comprising only one and the same pea starch, both in the primary part and in the secondary part, in this instance the pea starch described in Example 1.

The compositions prepared thus correspond to the following implementations:

Formulation A: Maize starch/Potato starch,

Formulation B: Pea starch/Pea starch.

| Materials: |  | Pea starch |
|---|---|---|
| Primary | Maize starch | Pea starch |
| Secondary | Potato starch | (invention) |
| Primary part: | | |
| Water | 116 | 132.4 |
| Amylaceous material | 14 | 12.2 |
| Heating | 45° C. | 42° C. |
| Sodium hydroxide (pure) | 1.5 | 1.36 |
| Stirring | 15 minutes | 10 minutes |
| Secondary: | | |
| Water | 177 | 191.4 |
| Temperature | 25° C. | 25° C. |
| Borax | 2 × 0.4 | 1.2 |
| Amylaceous material | 108 | 106 |
| Stirring | 15 minutes | 10 minutes |
| Total: Water | 296.6 | 328.6 |
| Amylaceous material total | 122 | 118.2 |
| Overall solids content | 29.25% | 26.65% |
| Lory viscosity | 25 seconds | 24 seconds |
| Temperature | 33° C. | 33° C. |

The compositions, control from the formulation A on the one hand, according to the invention from the formulation B on the other hand, are subsequently subjected to comparative tests, from different papers, in the context of the manufacture of "single wall" (SW) and "double wall" (DW) fibreboard.

It is observed that it is entirely possible to maintain, with the two types of formulation A or B, the same characteristics relating to the deposition of adhesive and to the thickness of the film.

A careful but simple examination carried out at the end of the machine shows an adhesive bonding of better quality with the use of the adhesive composition according to the invention, in comparison with the control formulation. Furthermore, it also appears there visibly drier.

The feeling of better adhesive bonding is confirmed by a stack examination, an assessment reinforced by the fact that the fibreboard assembled with pea starch does not "smoke" in a stack, in contrast to fibreboard manufactured with potato starch.

EXAMPLE 3

Adhesive compositions obtained with pea starch, in accordance with the invention, or wheat starch, according to Example 1, are prepared.

Good resistance to water is sought by adding, at the end of the preparation, to one and the other of these compositions, 7% of Lyspac 1070 L resin, calculated with respect to the amount of starch.

After addition of the resin, the characteristics of the adhesives are as follows:

| Characteristics of the adhesives | Pea starch (invention) | Wheat starch |
|---|---|---|
| Lory viscosity | 22 seconds | 18 seconds |
| Brookfield viscosity | 280 mPa·s | 320 mPa·s |
| Stein-Hall viscosity | 97 seconds | 100 seconds |
| Refractive index | 7.2 | 7.3 |
| Lory viscosity: | | |
| after 2 min. | 30.5 seconds | 35 seconds |
| after 5 min. | 41 seconds | 47 seconds |

-continued

| Characteristics of the adhesives | Pea starch (invention) | Wheat starch |
|---|---|---|
| after 10 min. | 64 seconds | 77.5 seconds |
| Gelatinization point - secondary part after assembling | 56.5° C. | 57.25° C. |
| Tack - 95° C. on a Strohlein device OT = 0 | 170 mJ | 145 mJ |
| Wet energy (Strohlein) | 215 mJ | 135 mJ |
| FEFCO No. 9 test - after 24 h | 100% | 60% |
| FEFCO No. 9 test - after 48 h | 100% | 40% |

It is observed that the viscosity characteristics of the adhesive composition obtained from pea starch are, in the presence of resin, entirely advantageous, in particular as compared to compositions commonly used, in this instance prepared with wheat starch.

The stability of the viscosity of the adhesive compositions according to the invention, after addition of the resin, is remarkable.

The performances of these compositions, both with regard to wet energy (wet pin adhesion) and in the context of the European constraints of the FEFCO No. 9 test, are quite exceptional.

EXAMPLE 4

Compositions corresponding to the formulations A and B Example 2 are prepared.

At the end of the preparation, the following are respectively added:

For the formulation A, 1.66%, calculated on a dry basis, of a ketone-formaldehyde resin, low in free formaldehyde, with a solids content of 40%, with respect to the total adhesive, For the formulation B, 0.77%, calculated on a dry basis, of the same resin, i.e. a reduction in dose of more than 50%.

Adhesive compositions are prepared under the same experimental conditions as in Example 1 and then measurements of pin adhesion in the wet state are carried out on the fibreboard obtained according to TAPPI Standard T-821 om-87.

It is observed that the formulation of type B, characterized by the presence of the pea starch alone and by a very substantially reduced amount of resin, makes possible an increase of 19% in the resistance according to the pin adhesion in the wet state, an increase expressed in comparison with the formulation of type A, with maize starch and potato starch.

EXAMPLE 5

In this example, wheat starch and pea starch are compared.

A first phase consists in attempting to verify and confirm the tendencies observed in Example 1.

A second phase consists in finding a formulation which makes it possible to achieve the desired resistance to water and which is at the same time devoid of any formaldehyde resin or even of any crosslinking or intrinsically hydrophobic synthetic resin.

The choice is made, in attempting to obtain the best results, i.e. to satisfy the restrictions laid down in the context of the FEFCO No. 9 test, to add sufficient amounts of aluminium sulphate.

As is observed (table below), it is then preferable to slightly modify the formulation.

Wheat starch exhibiting an amylose level of 21%

Change in the parameters:

|  | Base formulation | Formulation with Al sulphate | Formulation with Al sulphate, modified |
|---|---|---|---|
| Primary part: |  |  |  |
| Water | 450 ml | 450 ml | 450 ml |
| Wheat starch | 43 g | 43 g | 49 g |
| Pure sodium hydroxide and water | 5 g/10 ml | 5 g/10 ml | 6 g/10 ml |
| Heating | 45° C. | 45° C. | 45° C. |
| stirring | 10 minutes | 10 minutes | 10 minutes |
| Secondary part: |  |  |  |
| Water | 630 ml | 630 ml | 630 ml |
| Wheat starch | 377 g | 377 g | 371 g |
| Borax | 4 g | 1 g | 1 g |
| Aluminium sulphate | Without | 2 g | 2 g |
| Characteristics |  |  |  |
| Lory viscosity | 24 seconds | 20 seconds | 23 seconds |
| Brookfield viscosity | 470 mPa · s | 500 mPa · s | 490 mPa · s |
| Stein-Hall viscosity | 116 seconds | 116 seconds | 87 seconds |
| Refractive index | 4.0 | 6.8 | 4.7 |
| Lory viscosity |  |  |  |
| After 2 min. | 29 seconds | 29 seconds | 25 seconds |
| After 5 min. | 34 seconds | 44 seconds | 27 seconds |
| After 10 min. | 40 seconds | 84 seconds | 31.5 seconds |
| Gelatinization point (secondary part after assembling) | 52° C. | 55.5° C. | 52° C. |

It may be noticed that the approach which consists simply in adding aluminium sulphate without any other precaution is not satisfactory. In this case, the change in the adhesive on storage is unacceptable due to the severity of the phenomenon.

Likewise, the gelatinization point must be regarded as no longer optimal.

These observations result in a necessary adjustment to the formulation.

In the present case, it is recommended, for good balance, to replace 3 parts of borax by 2 parts of aluminium sulphate.

Adhesive bonding performances in the wet state:

| Tack on a Strohlein device, 140° C., OT = 0 | 520 mJ | 465 mJ | 495 mJ |
|---|---|---|---|
| Wet energy (Strohlein) |  |  |  |
| With maturing 24 h | 50 mJ | 55 mJ | 75 mJ |
| With maturing 1 week | 60 mJ | 70 mJ | 80 mJ |
| FEFCO No. 9 test |  |  |  |
| With maturing 24 h | 0 | 0 | 0 |
| With maturing 1 week | 0 | 0 | 0 |

Although the adhesive bondings produced are satisfactory, in particular in terms of tack, it is not possible, with the wheat starch, to hope for the slightest satisfaction in terms of resistance to water, in particular according to the FEFCO No. 9 test.

Pea starch having the following characteristics:

an amylose level of 35.3%, a level of proteins of 0.21%, a purity of greater than 96%, a content of colloidal matter of less than 1%, a content of total lipids of 0.03%.

Change in the parameters:

|  | Base formulation | Formulation with aluminium sulphate, modified |
|---|---|---|
| Primary part: |  |  |
| Water | 450 ml | 450 ml |
| Pea starch | 39 g | 43 g |
| Heating | 45° C. | 45° C. |
| Pure sodium hydroxide and water | 5 g/10 ml | 5 g/10 ml |
| Stirring | 10 minutes | 10 minutes |
| Secondary part: |  |  |
| Water | 630 ml | 630 ml |
| Pea starch | 381 g | 377 g |
| Borax | 4 g | 1 g |
| Aluminium sulphate | Without | 2 g |
| Characteristics |  |  |
| Lory viscosity | 22 seconds | 22.5 seconds |
| Brookfield viscosity | 440 mPa · s | 530 mPa · s |
| Stein-Hall viscosity | 102.5 seconds | 92.5 seconds |
| Refractive index | 4.1 | 4.5 |
| Change at rest (Lory) |  |  |
| After 2 minutes | 25 seconds | 24 seconds |
| After 5 minutes | 29 seconds | 27.5 seconds |
| After 10 minutes | 32.5 seconds | 31.5 seconds |
| Gelatinization point (secondary part after assembling) | 51° C. | 51.5° C. |

The necessary modifications carried out in the formulation comprising aluminium sulphate are entirely minor, provided that one replaces three parts of borax by two parts of aluminium sulphate.

Thus, characteristics relating to the change in the viscosity are achieved which are particularly satisfactory and suitable in terms of operation of the machine and of the circuits for circulation of adhesive.

| Tack on a Strohlein device, 140° C., OT = 0 | 520 mJ | 520 mJ |
|---|---|---|
| Wet energy (Strohlein) |  |  |
| With maturing 24 h | 185 mJ | 250 mJ |
| With maturing 1 week | 200 mJ | 220 mJ |
| FEFCO No. 9 test |  |  |
| With maturing 24 h | 60% | 100% |
| With maturing 1 week | 60% | 100% |

At the same time as suitable operation, such compositions make it possible to achieve a degree of resistance to water which is inadequate without addition of aluminium sulphate but which, with this commonly used salt, fully meets the European standards in force, which require all the test specimens to behave well when soaked, without it being necessary to add the slightest amount of synthetic resin, in particular formaldehyde resin.

EXAMPLE 6

The principle of this example consists in grasping the importance of the "solids content of the adhesives" parameter with regard to the performances which are capable of being achieved with the pea starch, in particular resistance to water.

The pea starch is that considered in Example 5:

|  | Formulation "Pea starch" 28% SC | | Formulation "Pea starch" 22% SC | |
|---|---|---|---|---|
|  | Without aluminium sulphate | With aluminium sulphate | Without aluminium sulphate | With aluminium sulphate |
| Primary part: |  |  |  |  |
| Water | 450 ml | 450 ml | 450 ml | 450 ml |
| Pea starch | 33 g | 41 g | 40 g | 50 g |
| Heating | 45° C. | 45° C. | 45° C. | 45° C. |
| Pure sodium hydroxide and water | 3.5 g/10 ml | 5 g/10 ml | 4.2 g/10 ml | 5 g/10 ml |
| Stirring | 10 min. | 10 min. | 10 min. | 10 min. |
| Secondary part: |  |  |  |  |
| Water | 630 ml | 630 ml | 720 ml | 720 ml |
| Pea starch | 379 g | 379 g | 290 g | 280 g |
| Borax | 4 g | 1 g | 4 g | 1 g |
| Aluminium sulphate | Without | 2 g | Without | 2 g |
| Stirring | 10 min. | 10 min. | 10 min. | 10 min. |

Adhesive compositions according to the invention can very satisfactorily be prepared at solid contents as different as 22 and 28%.

| Characteristics |  |  |  |  |
|---|---|---|---|---|
| Lory viscosity | 21.5 sec. | 23 sec. | 21 sec. | 24 sec. |
| Brookfield viscosity | 440 mPa · s | 550 mPa · s | 360 mPa · s | 520 mPa · s |
| Stein-Hall viscosity | 93 sec. | 90 sec. | 80.5 sec. | 92 sec. |
| Refractive index | 3.5 | 4.3 | 3.7 | 4.7 |
| Lory viscosity: |  |  |  |  |
| After 2 minutes | 23 sec. | 24.5 sec. | 21 sec. | 26 sec. |
| After 5 minutes | 26.5 sec. | 28 sec. | 23.5 sec. | 30 sec. |
| After 10 minutes | 31.5 sec. | 31.5 sec. | 27.5 sec. | 34 sec. |
| Gelatinization point Secondary part |  |  |  |  |
| Before assembling | 51° C. | 50° C. | 50° C. | 50° C. |
| After assembling | 52° C. | 51.5° C. | 51.5° C. | 52° C. |

These adhesive compositions according to the invention exhibit satisfactory characteristics, both in terms of rheology and as regards the refractive index read and the gelatinization points.

|  |  |  |  |  |
|---|---|---|---|---|
| Tack on a Strohlein device, 140° C., OT = 0 Wet energy (Strohlein) | 525 mJ | 530 mJ | 430 mJ | 430 mJ |
| With maturing 24 h | 230 mJ | 225 mJ | 140 mJ | 170 mJ |
| With maturing 1 week FEFCO No. 9 test | 240 mJ | 225 mJ | 145 mJ | 190 mJ |
| With maturing 24 h | 100% | 100% | 0 | 20% |
| With maturing 1 week | 100% | 100% | 40% | 80% |
| Dry pin adhesion test | 32 daN | 40 daN | 40 daN | 45 daN |

The difference between the results obtained, in terms of resistance to water, at solid contents of 22% and 28% is altogether significant.

These tests show that it is necessary to observe a minimum solids content in order to aspire to results of resistance to water which observe the European standard, which requires that all the test specimens behave well for at least 24 hours.

EXAMPLE 7

Various salts are used here as agents for improving the resistance to water instead of the aluminium sulphate considered above.

The tests were carried out on adhesive compositions prepared from pea starch exhibiting a solids content of 22%, i.e., deliberately, under conditions supposed to be difficult.

|  | Without improving agent | Aluminium sulphate | Zinc sulphate | Diammonium phosphate |
|---|---|---|---|---|
| Primary part: |  |  |  |  |
| Water | 450 ml | 450 ml | 450 ml | 450 ml |
| Pea starch | 40 g | 50 g | 49 g | 50 g |
| Heating | 45° C. | 45° C. | 45° C. | 45° C. |
| Pure sodium hydroxide and water | 4.2 g/ 10 ml | 5 g/ 10 ml | 5 g/ 10 ml | 5 g/ 10 ml |
| Stirring | 10 min. | 10 min. | 10 min. | 10 min. |
| Secondary part: |  |  |  |  |
| Water | 720 ml | 720 ml | 720 ml | 720 ml |
| Pea starch | 290 g | 280 g | 281 g | 280 g |
| Borax | 4 g | 1 g | 1 g | 1 g |
| Aluminium sulphate | — | 2 g | — | — |
| Zinc sulphate | — | — | 2 g | — |
| Diammonium phosphate | — | — | — | 2 g |
| Stirring | 10 min. | 10 min. | 10 min. | 10 min. |
| Characteristics |  |  |  |  |
| Lory viscosity | 21 sec. | 24 sec. | 22 sec. | 21 sec. |
| Brookfield viscosity | 360 mPa·s | 520 mPa·s | 530 mPa·s | 480 mPa·s |
| Stein-Hall viscosity | 80.5 sec. | 92 sec. | 94.5 sec. | 82.5 sec. |
| Refractive index | 3.7 | 4.7 | 4.4 | 4.7 |
| Lory viscosity |  |  |  |  |
| After 2 min. | 21 sec. | 26 sec. | 27 sec. | 23.5 sec. |
| After 5 min. | 23.5 sec. | 30 sec. | 31 sec. | 26.5 sec. |
| After 10 min. | 27.5 sec. | 34 sec. | 38.5 sec. | 37 sec. |

-continued

|  | Without improving agent | Aluminium sulphate | Zinc sulphate | Diammonium phosphate |
|---|---|---|---|---|
| Gelatinization point (secondary part) |  |  |  |  |
| Before assembling | 50° C. | 50° C. | 51.5° C. | 52.5° C. |
| After assembling | 51.5° C. | 52° C. | 52° C. | 54° C. |

Aluminium sulphate and zinc sulphate behave best in terms of development of viscosity and of the change in the latter over time.

|  |  |  |  |  |
|---|---|---|---|---|
| Tack on a Strohlein device, Open time OT = 0 Wet energy (Strohlein) | 430 mJ | 430 mJ | 440 mJ | 395 mJ |
| With maturing 24 h | 140 mJ | 170 mJ | 180 mJ | 160 mJ |
| With maturing 1 week FEFCO No. 9 test | 145 mJ | 190 mJ | 190 mJ | 170 mJ |
| With maturing 24 h | — | 20% | 100% | 40% |
| With maturing 1 week | 40% | 80% | 100% | 60% |
| Dry pin adhesion test | 40 daN | 45.1 daN | 46.7 daN | 47.65 daN |

The tests on a Strohlein device, whether they are tack tests or tests relating to the wet energy, and in particular the results obtained in the FEFCO No. 9 test establish the same hierarchy in favour of zinc sulphate, particularly beneficial to the resistance to water.

This is because it is more favourable than aluminium sulphate in so far as this zinc salt makes it possible to meet the requirement of the European standard from the moment when the adhesive composition exhibits a solids content of at least 22%.

This solids content is scarcely higher than that of a conventional, relatively multipurpose, formulation not possessing resistance to water.

It is also confirmed, from the results recorded with diammonium phosphate, that there is no correlation between the measurements of pin adhesion in the wet state and the FEFCO No. 9 test.

EXAMPLE 8

The principle of this example consists of tests which establish, in a comparative fashion, the performances exhibited in terms of resistance to water and judged according to the European standard FEFCO No. 9 by:
  a "Stein-Hall" formulation with pea starch (identical to that of Example 5, i.e. with 35.3% of amylose) in accordance with the invention in the primary part and in the secondary part, with a solids content of 28%, and,
  a "Stein-Hall" formulation with maize starch comprising 70% of amylose in the carrier, and maize starch in the secondary part, in accordance with Patent EP 0 627 478, with a solids content of 28%, none of them comprising, as described in the said patent, any other agent capable of conferring or of strengthening resistance to water.

|  | Pea starch/Pea starch | Maize starch comprising 70% of amylose/Maize starch |
|---|---|---|
| Primary part: |  |  |
| Water | 450 ml | 450 ml |
| Amylaceous material | 33 g | 70 g |
| Heating | 45° C. | 55° C. |
| Pure sodium hydroxide and water | 3.5 g/10 ml | 8.5 g/20 ml |
| Stirring | 10 min. | 10 min. |
| Secondary part: |  |  |
| Water | 630 ml | 630 ml |
| Amylaceous material | 379 g | 350 g |
| Borax | 4 g | 3.5 g |
| Stirring | 10 min. | 10 min. |

The two formulations are prepared in very different ways, in particular as regards the scale of the primary starch, the need to heat and the amount of alkaline agent.

| Characteristics |  |  |
|---|---|---|
| Lory viscosity | 21.5 sec. | 23 sec. |
| Brookfield viscosity | 440 mPa · s | 1 180 mPa · s |
| Stein-Hall viscosity | 93 sec. | 114 sec. |
| Refractive index | 3.5 | 6.3 |
| Lory viscosity |  |  |
| After 2 minutes | 23 sec. | 28.5 sec. |
| After 5 minutes | 26.5 sec. | 33.5 sec. |
| After 10 minutes | 31.5 sec. | 40.5 sec. |
| Gelatinization point (secondary part) |  |  |
| Before assembling | 51° C. |  |
| After assembling | 52° C. | 53° C. |

The difference recorded between the refractive indices is to be attributed essentially to the parts of primary starch envisaged.

In addition to the fact that the formulation based on pea starch according to the invention comprises a single amylaceous starting material, unlike the formulation exhibiting a specific and expensive amylose-rich grade, it is noted that the high Brookfield viscosity obtained with the use of amylose-rich starch in the primary part, for the same Lory viscosity, by flow, reflects the observation of a manifestly shorter and slacker adhesive, possibly capable of reducing the speed and for which the machine settings will certainly have to be modified.

At the same time, the change in the viscosity over time, which is faster in this case, is harmful.

| Tack - Strohlein device, 140° C. - OT = 0 | 525 mJ | 535 mJ |
|---|---|---|
| Wet energy (Strohlein) |  |  |
| With maturing 24 h | 230 mJ | 235 mJ |
| With maturing 1 week | 240 mJ | 240 mJ |
| FEFCO No. 9 test |  |  |
| With maturing 24 h | 100% | 40% |
| With maturing 1 week | 100% | 100% |

While the values of tack, which favour the speed, or of energy necessary for the separation in the wet state are similar, the results obtained by the FEFCO No. 9 test are substantially different and significantly to the advantage of the "pea starch/pea starch" formulation in accordance with the invention.

EXAMPLE 9

This example illustrates the more specific case of the preparation of an adhesive according to the process known to a person skilled in the art under the name of "Minocar" process, which consists of the preparation of a carrier (primary part), essentially comprising partially swollen granules of pea starch, to which a secondary part, composed of granular pea starch, is added.

It is thus possible to arrive, for example, at the following formulation:

1—Preparation of the primary part:

Water: 10,

Pea starch (identical to that of Example 5, i.e. with 35.3% of amylose): 143,

Adjustment of the temperature to 33° C.,

Solution, comprising 4.9 of pure sodium hydroxide per 10 of water, introduced over 5 minutes, Stirring at 1 750 revolutions per minute, Halting the reaction with aluminium sulphate after 11 minutes, 2—Introduction of the secondary part:

Water: 209,

Granular pea starch (35.3% of amylose): 285,

Water: 79,

Borax: 2.0,

Stirring at 1 750 revolutions per minute for 15 minutes.

The characteristics exhibited by the adhesive are as follows:

Lory viscosity: 15.5 seconds,

Brookfield viscosity: 730 mPa.s,

Refractive index: 1.9,

Gelatinization point: 46.5° C.

Such an adhesive makes it possible to aspire to the following essential performances:

| Tack - Strohlein device, 110° C. - OT = 0 | 250 mJ |
|---|---|
| Wet energy (Strohlein) |  |
| With maturing 24 h | 185 mJ |
| With maturing 1 week | 190 mJ |
| FEFCO No. 9 test |  |
| With maturing 24 h | 80% |
| With maturing 1 week | 100% |

In the context of a limited heat contribution, the performances, in particular in terms of resistance to water according to the FEFCO No. 9 test, are judged to be excellent.

EXAMPLE 10

The principle of this example consists of an objective which is slightly more specific still, i.e. the preparation of a ready-for-use product which can exhibit the desired adhesive bonding performances and can also meet the requirements of resistance to water, in particular according to the FEFCO No. 9 test.

The studies concerned by this example have taken into account the essential elements, such as solids content at use and nature of the pre-solubilized amylaceous material, as well as its possible modification, in particular chemical modification.

A formulation which is particularly satisfactory from a technical viewpoint and attractive under the aspect of the cost price is thus drawn up:

|  | Participation (in percentage) |
| --- | --- |
| Maize starch comprising 70% of amylose, pregelatinized | 5.8 |
| Pea starch comprising 35.3% of amylose, pregelatinized | 5.8 |
| Pea starch comprising 35.3% of amylose, granular | 85.75 |
| Sodium carbonate | 1 |
| Calcium hydroxide | 0.7 |
| Borax | 0.95 |

An adhesive is prepared by addition of water, so as to exhibit a solids content of 28%.

It exhibits the following characteristics:

| Lory viscosity | 28 seconds |
| --- | --- |
| Brookfield viscosity | 450 mPa · s |
| Refractive index | 4.8 |
| Gelatinization point | 52.5° C. |

The flow (Lory) and shear (Brookfield) viscosity measurements reflect the quality of texture observed with this adhesive preparation.

The gelatinization point is entirely suited to the use.

| Tack - Strohlein device, 140° C. - OT = 0 Wet energy (Strohlein) | 625 mJ |
| --- | --- |
| With maturing 24 h | 260 mJ |
| With maturing 1 week | 270 mJ |
| FEFCO No. 9 test | |
| With maturing 24 h | 100% |
| With maturing 1 week | 100% |

The results seem particularly advantageous, whether in terms of tack, of wet energy and, in particular, of resistance to water according to the FEFCO No. 9 test.

The invention claimed is:

1. An adhesive composition, comprising:
    an aqueous dispersion having a primary part, composed essentially of a gelatinized starch, and a secondary part, essentially comprising a nongelatinized starch and/or a swollen starch, in which:
        the starch of the primary part comprises a starch selected from the group consisting of native and modified legume starches, native and modified cereal starches and native and modified tuber starches, alone or as a mixture with one another, and
        when the starch of the primary part comprises a legume starch, the starch of the secondary part is then selected from the group consisting of native legume starches, native and modified cereal starches and native and modified tuber starches having an amylose content of less than 30%, alone or as a mixture with one another, and,
        when the starch of the primary part is a native or modified cereal or tuber starch, the starch of the secondary part comprises at least one native legume starch; and
    said legume starches furthermore exhibiting a purity of greater than 90%, colloidal matter and/or fibrous residue contents of less than 1% (dry/dry), protein contents of less than 1% (dry/dry), and an amylose content of between 30 and 52% (dry/dry).

2. The adhesive composition according to claim 1, wherein said legume starches exhibit a purity of greater than 95%.

3. The adhesive composition according to claim 1, wherein said legume starches exhibit a purity of greater than 98%.

4. The adhesive composition according to claim 1, wherein the amylose content of the legume starch or starches is between 30.5 and 45% (dry/dry)

5. The adhesive composition according to claim 1, wherein the amylose content of the legume starch or starches is greater than 31% and less than 40% (dry/dry).

6. The adhesive composition according to claim 1, wherein the amylose content of the legume starch or starches is between 31.5 and 39.5% (dry/dry).

7. The adhesive composition according to claim 1, comprising between 10 and 40% by weight of legume starch, with respect to the whole of said composition.

8. The adhesive composition according to claim 1, further comprising between 0.3 to 5% by weight of an alkaline substance, with respect to the whole of said composition.

9. The adhesive composition according to claim 1, further comprising between 0.01 to 5% by weight, with respect to the total starch, of borax or of any other boron-carrying chemical compound.

10. The adhesive composition according to claim 1, exhibiting a solids content of greater than approximately 26%.

11. The adhesive composition according to claim 1, exhibiting a solids content equal to or greater than 28%.

12. The adhesive composition according to claim 1, further comprising an amount of a chemical agent which is at least equal to that which allows said adhesive composition to confer, onto a final corrugated fibreboard properties of resistance to water according to the FEFCO No. 9 test, wherein said chemical agent is selected from the group consisting of sulphates, zirconium-carrying compounds and diammonium phosphate.

13. The adhesive composition according to claim 12, exhibiting a solids content of greater than approximately 20%.

14. The adhesive composition according to claim 12, exhibiting a solids content equal to or greater than 22%.

15. The adhesive composition according to claim 12, exhibiting a solids content of greater than approximately 24%.

16. The adhesive composition according to claim 12, exhibiting a solids content equal to or greater than 26%.

17. The adhesive composition according to claim 12, wherein the chemical agent is a sulphate selected from the group consisting of zinc sulphate, aluminium sulphate and copper sulphate.

18. The adhesive composition according to claim 1, further comprising an amount of a resin which is at least equal to that which allows said adhesive composition to confer, onto a final corrugated fibreboard properties of resistance to water according to the FEFCO No. 9 test, wherein said resin is selected from the group consisting of formaldehyde resins and of formaldehyde-free synthetic resins.

19. A process for the preparation of corrugated fibreboard, comprising, at least once, the following steps:
   applying, to the tips of the flutes of a preshaped paper strip, an adhesive composition according to claim 1,
   applying a flat paper or a flat fibreboard to the flute tips thus coated with the adhesive composition, and
   drying.

20. A corrugated fibreboard, comprising an adhesive composition according to claim 1.

21. The corrugated fibreboard according to claim 20, exhibiting a resistance to water according to the criteria defined by the FEFCO No. 9 test.

22. A corrugated fibreboard comprising an adhesive composition according to claim 1, which is selected from the group consisting of "single face", "single wall" or "triple wall" fibreboard, "heavy" fibreboard, fibreboard exhibiting a number of flutes of greater than 3, and/or microflutes.

23. An adhesive composition, comprising:
   an aqueous dispersion having a primary part, composed essentially of a gelatinized starch, and a secondary part, essentially comprising a nongelatinized starch and/or a swollen starch, in which:
      the starch of the secondary part is a native legume starch, and
      the starch of the primary part is optionally a native or modified legume starch,
   said starches exhibiting a high purity of greater than 90%, less than 1% (dry/dry) of colloidal matter and of fibrous residues, less than 1% of proteins, and an amylose content of between 30 and 52%.

24. The adhesive composition according to claim 23, wherein said starches exhibit a purity of greater than 95%.

25. The adhesive composition according to claim 23, wherein said legume starches exhibit a purity of greater than 98%.

26. The adhesive composition according to claim 23, wherein the amylose content of the legume starch or starches is between 30.5 and 45% (dry/dry).

27. The adhesive composition according to claim 23, wherein the amylose content of the legume starch or starches is greater than 31% and less than 40% (dry/dry).

28. The adhesive composition according to claim 23, wherein the amylose content of the legume starch or starches is between 31.5 and 39.5% (dry/dry).

29. The adhesive composition according to claim 23, further comprising between 10 and 40% by weight of legume starch, with respect to the whole of said composition.

30. The adhesive composition according to claim 23, further comprising between 0.3 to 5% by weight of an alkaline substance, with respect to the whole of said composition.

31. The adhesive composition according to claim 23, further comprising between 0.01 to 5% by weight, with respect to the total starch, of borax or of any other boron-carrying chemical compound.

32. The adhesive composition according to claim 23, exhibiting a solids content of greater than approximately 26%.

33. The adhesive composition according to claim 23, exhibiting a solids content equal to or greater than 28%.

34. The adhesive composition according to claim 23, comprising amount of a chemical agent which is at least equal to that which allows said adhesive composition to confer, onto a final corrugated fibreboard properties of resistance to water according to the FEFCO No. 9 test, said chemical agent selected from the group consisting of sulphates, zirconium-carrying compounds and diammonium phosphate.

35. The adhesive composition according to claim 34, wherein the chemical agent is a sulphate selected from the group consisting of zinc sulphate, aluminium sulphate and copper sulphate.

36. The adhesive composition according to claim 23, further comprising an amount of a resin which is at least equal to that which allows said adhesive composition to confer, onto a final corrugated fibreboard properties of resistance to water according to the FEFCO No. 9 test, said resin is selected from the group consisting of formaldehyde resins and of formaldehyde-free synthetic resins.

37. A process for the preparation of corrugated fibreboard, comprising, at least once, the following steps:
   applying, to the tips of the flutes of a preshaped paper strip, an adhesive composition according to claim 23,
   applying a flat paper or of a flat fibreboard to the flute tips thus coated with the adhesive composition, and
   drying.

38. A corrugated fibreboard, comprising an adhesive composition according to claim 23.

* * * * *

UNITED STATES PATENT AND TRADEMARK OFFICE
CERTIFICATE OF CORRECTION

PATENT NO. : 7,591,892 B2 Page 1 of 1
APPLICATION NO. : 10/534037
DATED : September 22, 2009
INVENTOR(S) : Gombert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1143 days.

Signed and Sealed this

Twenty-first Day of September, 2010

David J. Kappos
*Director of the United States Patent and Trademark Office*